(12) United States Patent
Wiebe

(10) Patent No.: US 8,823,226 B2
(45) Date of Patent: Sep. 2, 2014

(54) SEALED ELECTRIC GENERATOR

(75) Inventor: Markus Roland Wiebe, Basel (CH)

(73) Assignee: Alstom Technology Ltd, Baden (CH)

( * ) Notice: Subject to any disclaimer, the term of this patent is extended or adjusted under 35 U.S.C. 154(b) by 707 days.

(21) Appl. No.: 12/971,662

(22) Filed: Dec. 17, 2010

(65) Prior Publication Data

US 2011/0163619 A1 Jul. 7, 2011

(30) Foreign Application Priority Data

Jan. 5, 2010 (EP) .................................... 10150073

(51) Int. Cl.
*H02K 5/22* (2006.01)
*H02K 11/00* (2006.01)
*H02K 5/124* (2006.01)

(52) U.S. Cl.
CPC ............... *H02K 5/124* (2013.01); *H02K 5/225* (2013.01)
USPC ..................... 310/71; 310/89; 310/55; 310/56

(58) Field of Classification Search
CPC ................................. H02K 5/225; H02K 3/24
USPC ........... 310/88, 89, 55, 61; 277/420, 422, 421
See application file for complete search history.

(56) References Cited

U.S. PATENT DOCUMENTS

| | | | | |
|---|---|---|---|---|
| 3,733,502 A | * | 5/1973 | Curtis et al. ..................... | 310/61 |
| 4,091,299 A | * | 5/1978 | Vitchenko et al. ............... | 310/71 |
| 5,015,895 A | * | 5/1991 | Obley .............................. | 310/71 |
| 5,382,856 A | * | 1/1995 | Keck et al. ....................... | 310/71 |
| 5,777,408 A | * | 7/1998 | Brem ............................... | 310/71 |
| 6,236,128 B1 | | 5/2001 | Dragash, Jr. | |
| 2003/0042810 A1 | * | 3/2003 | Tornquist et al. ............... | 310/71 |
| 2006/0250038 A1 | * | 11/2006 | Rea et al. ......................... | 310/88 |
| 2011/0133585 A1 | * | 6/2011 | Langenbacher ................ | 310/88 |
| 2011/0309780 A1 | * | 12/2011 | Bandaru et al. ............... | 318/490 |

FOREIGN PATENT DOCUMENTS

| | | |
|---|---|---|
| DE | 2439151 | 2/1975 |
| DE | 3412786 | 10/1985 |
| DE | 4333093 | 3/1995 |
| EP | 0601826 | 6/1994 |
| EP | 0645874 | 3/1995 |

OTHER PUBLICATIONS

European Search Report for EP Patent App. No. 10150073.4 (Mar. 24, 2011).
Search Report for German Patent App. No. 10 2010 054 770.0 (Oct. 7, 2011).

\* cited by examiner

*Primary Examiner* — Terrance Kenerly
(74) *Attorney, Agent, or Firm* — Buchanan Ingersoll & Rooney

(57) ABSTRACT

A sealed electric generator includes a casing (2) housing a stator (3) and a rotor (4) connected to a shaft (5), wherein the shaft (5) is provided with a duct housing and a lead (10) carrying electric power from an exciter (8) to rotor field windings (9). The duct has a sealing unit for preventing gas contained inside of the casing (2) from reaching the exciter (8). The sealing unit has first and second seals (20, 21) defining between them a chamber (22), such that gas that leaks past a seal (20, 21) enters the chamber (22).

14 Claims, 3 Drawing Sheets

SEALED ELECTRIC GENERATOR

This application claims priority under 35 U.S.C. §119 to European App. No. 10150073.4, filed 5 Jan. 2010, the entirety of which is incorporated by reference herein.

BACKGROUND

1. Field of Endeavor

The present invention relates to an improved sealed electric generator.

2. Brief Description of the Related Art

With reference to FIGS. 1 and 2, sealed electric generators 1 include a casing 2 that houses a stator 3 and a rotor 4 rotatable therein.

The rotor 4 has a shaft 5 that is supported by bearings 6. Seal rings 7 are provided to seal the inner of the casing 2 (usually containing $H_2$) against the outer environment.

Generators 1 are known to also include an exciter 8 that generates DC electric power to be fed to rotor windings 9.

The exciter 8 is normally located outside of the casing 2 and, in order to supply the DC electric power to the rotor windings 9, the shaft 5 is provided with a duct wherein a lead 10 is housed.

The lead 10 is connected at one side to the exciter 8, and at the other side to the rotor windings 9.

In addition, since the inside 11 of the casing 2 is filled with $H_2$, seals must be provided in order to prevent the $H_2$ from reaching the exciter 8, because $H_2$ when mixed with air generates explosive mixtures, that may explode in presence of sparks (caused by the exciter).

In particular, FIG. 1 shows a first type of generator in which the exciter 8 supplies electric power to slip rings 12 provided on a slip ring shaft 5a connected to the shaft 5.

As shown, in this embodiment the duct and the lead 10 extend in the shaft 5 and slip ring shaft 5a.

The slip rings 12 are connected to the lead 10 via radial rods 13 (inserted in radial holes connected to the duct); the lead 10 is then connected to the rotor windings 9 via radial stalks 14 (also inserted in radial holes connected to the duct).

In these generators the seals are traditionally located in position A between the radial holes and the corresponding radial stalks 14; in addition (for redundancy reasons) further seals are provided in position B between the radial holes and the corresponding radial rods 13.

Nevertheless this configuration prevents the lead 10 from being cooled by the $H_2$ (sealing is upstream of the lead 10).

In addition, because of the large diameter of the radial holes and stalks 14 housed therein, sealing in position A is difficult to achieve.

Moreover, testing operations to ascertain the quality of the seals are difficult to carry out, since the whole duct between positions A and B must be pressurized, this causing testing gas waste and practical difficulties.

Alternatively, the seals are mounted in position C between the duct and the lead 10 (between the generator shaft 5 and the slip ring shaft 5a) and also in this case further seals are provided (for redundancy reasons) in position B between the radial holes and the corresponding radial rods 13.

Nevertheless also in this case test operations are very difficult to be carried out, since position A must be closed and the duct between position A and B must be sealed (test operations between C and B are not feasible).

FIG. 2 shows a further generator type in which the generator shaft 5 is connected to the rotor 15 of the exciter 8 that encircles the stator 16.

In this case, traditionally the seal is provided in position D such that it is possible to cool the whole lead 10 with $H_2$ and, in addition, also quality testing during manufacturing can be carried out in a very easy way.

Nevertheless, further quality tests to be carried out, for example during generator outages, are not possible, because position D is only accessible from the inside of the rotor 15.

In addition to the above drawbacks, both generator types could have security problems, because in case the seals in position A or C and in position B leak (for the generator of FIG. 1) or in case the seal D leaks (for the generator of FIG. 2), $H_2$ would reach the exciter 8 (or its slip rings 12) before it is detected; this could cause very dangerous situations.

SUMMARY

One of numerous aspects of the present invention includes an improved sealed electric generator by which the aforementioned problems of the known art are addressed.

Another aspect of the present invention includes a generator in which sealing can be achieved in an easy way with reliable seals.

A further aspect of the present invention includes a generator in which test operations can be carried out in an easy and quick way not only during manufacturing, but also during short outages of the generator.

An additional aspect of the present invention includes a generator that has a very secure operation, since $H_2$ cannot unpredictably reach the exciter.

Advantageously, the lead feeding DC electric power from the exciter to the rotor windings can be cooled by $H_2$

BRIEF DESCRIPTION OF THE DRAWINGS

Further characteristics and advantages of the invention will be more apparent from the description of a preferred but non-exclusive embodiment of the generator according to the invention, illustrated by way of non-limiting example in the accompanying drawings, in which.

DETAILED DESCRIPTION OF EXEMPLARY EMBODIMENTS

Figure 1:
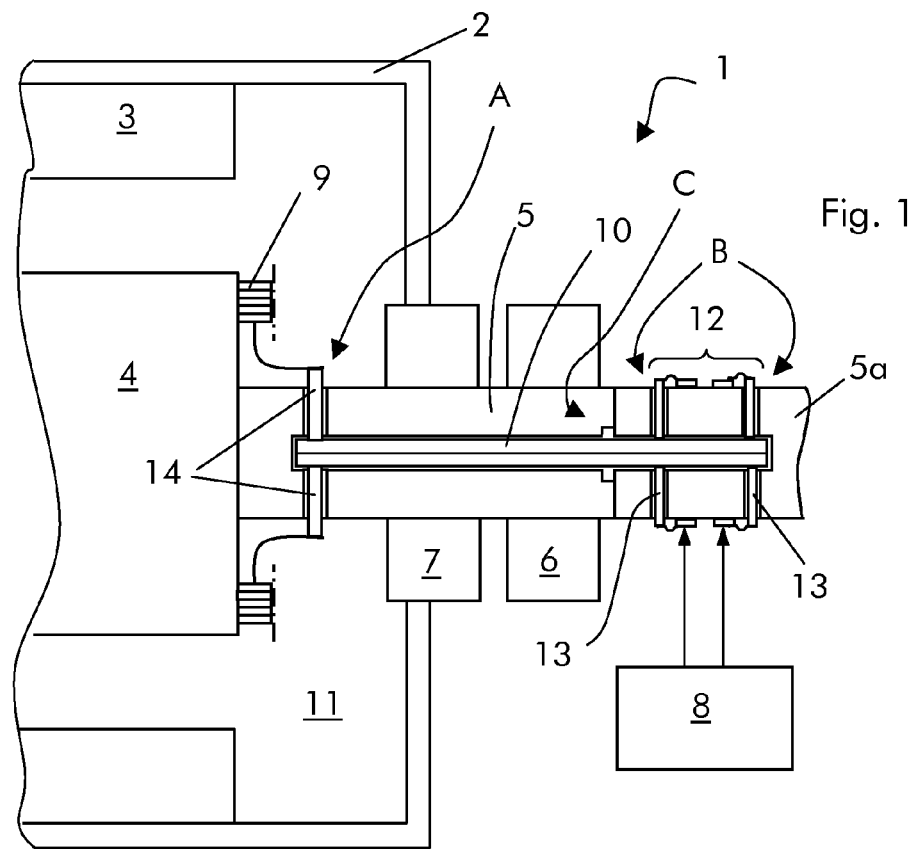
FIGS. 1 and 2 show two different types of generators.

In the following, like reference numerals indicate like elements already described.

An improved sealed electric generator 1, embodying principles of the present invention, includes a casing 2 housing a stator 3 and a rotor 4 with a shaft 5.

The shaft 5 is provided with a duct housing a lead 10 carrying electric power from a DC exciter 8 to rotor field windings 9.

The lead 10 is made of two conductive bars (typically made of copper) insulated from one another and each connected to a pole of the DC exciter 8.

The duct has one or more sealing units for preventing the gas contained inside 11 the casing 2 from reaching the exciter 8.

Each sealing unit has two or more seals, one adjacent to the other; in particular, each sealing unit includes a first seal 20 and a second seal 21 defining between each other a chamber 22, such that gas that leaks past seal 20 enters the chamber 22; i.e., possible leakages do not overcome the seals 20, 21.

In addition, the shaft 5 has holes 23 connecting the chamber 22 to the outside; these holes 23 have preferably a radial direction.

Advantageously in a region close to the outlet of the holes 23, a sensor 24 is provided for detecting the gas contained inside of the casing 2, typically being $H_2$; this lets the $H_2$ be detected, in case a leakage occurs, before it reaches the exciter 8 (or slip rings 12).

The two seals 20, 21 are spaced apart arranged in an enlarged portion of the duct, such that the chamber 22 is defined between the seals 20, 21 and a duct wall 25; naturally, in case the two seals 20, 21 are not adjacent one another, also the lead 10 takes part in defining the chamber 22.

Advantageously the seals 20, 21 are housed at a terminal portion of the shaft 5 where the enlarged duct portion is defined.

In particular, the enlarged duct portion has at least two different diameters, each for housing a seal 20 and 21 to allow an easy and quick insertion of the seals 20, 21 therein.

Preferably, as shown in the figures, the enlarged duct portion has three different diameters.

Figure 3:
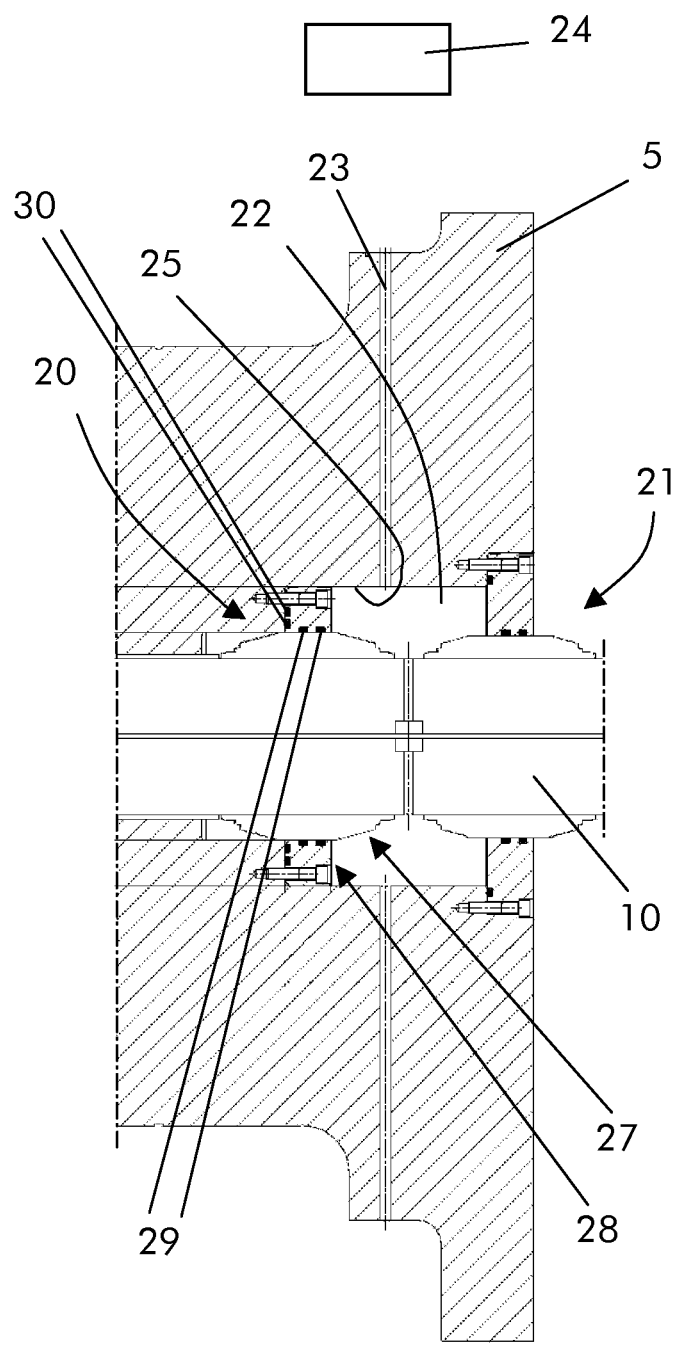
FIGS. 3 and 4 show the seals in an embodiment of the invention applied in a generator respectively of the type of FIGS. 1 and 2.

FIG. 3 shows an embodiment of the invention with the shaft 5 to be connected to a slip ring shaft 5a on which slip rings 12 are provided (FIG. 1).

Thus in this embodiment the enlarged duct portion is provided in position C and is closed by the slip ring shaft 5a (FIG. 1).

The duct has an axial portion, wherein the lead 10 is housed, and radial holes, wherein the radial stalks 14 to be connected to the rotor field windings 9 are housed; these elements are defined in the shaft 5.

In addition, the duct also partly extends in the slip ring shaft 5a where further radial holes are provided for housing the rods 13 connected to the slip rings 12.

Figure 4:
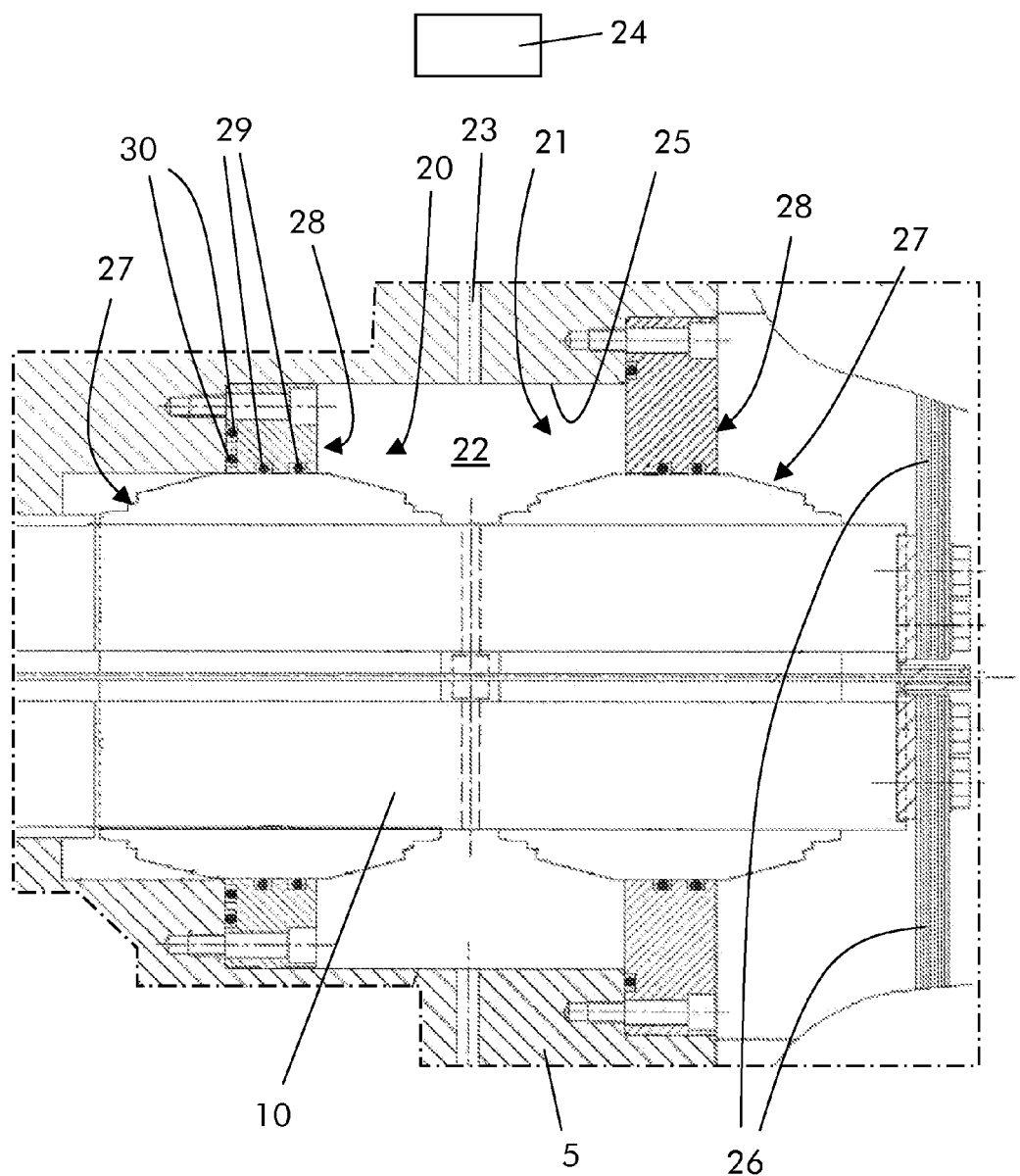

FIG. 4 shows a further embodiment with the shaft 5 connected to the exciter 8 that has a cylindrical rotor 15 encircling a stator 16.

In this embodiment the enlarged duct portion is preferably defined in position D and the lead 10 is connected to a couple of flexible plates 26 providing the electrical connection to the exciter 8 (FIG. 4).

Naturally, also in this embodiment the duct has an axial portion in which the lead 10 is housed and radial holes in which the radial stalks 14 are housed; in contrast, no further radial holes and no rods are provided and the lead 10 is directly connected to the exciter rotor 15.

In both embodiments shown, the two seals 20, 21 have the same features and in particular each seal has a portion 27 connected to the lead 10 and a portion 28 connected to the duct wall 25; O-rings 29 are provided between these two portions 27, 28. In addition, further O-rings 30 are provided between the portion 28 and shaft 5.

Preferably, for easy assembly, the inner diameter of the portion 28 corresponding to the outer diameter of the portion 27 of the seal 20 are larger than the inner diameter of the portion 28 corresponding to the outer diameter of the portion 27 of the seal 21.

Advantageously these seals 20, 21 allow a free movement of the lead 10 and rotor 5 with respect to one another, to allow free thermal expansion of the lead 10 and shaft 5.

The operation of the generator of the invention is apparent from that described and illustrated and is substantially the following.

During manufacturing, assembling is quick and easy, thanks to the two or preferably three different diameters of the enlarged duct wall 25 where the seals 20 and 21 are arranged.

Figure 2:
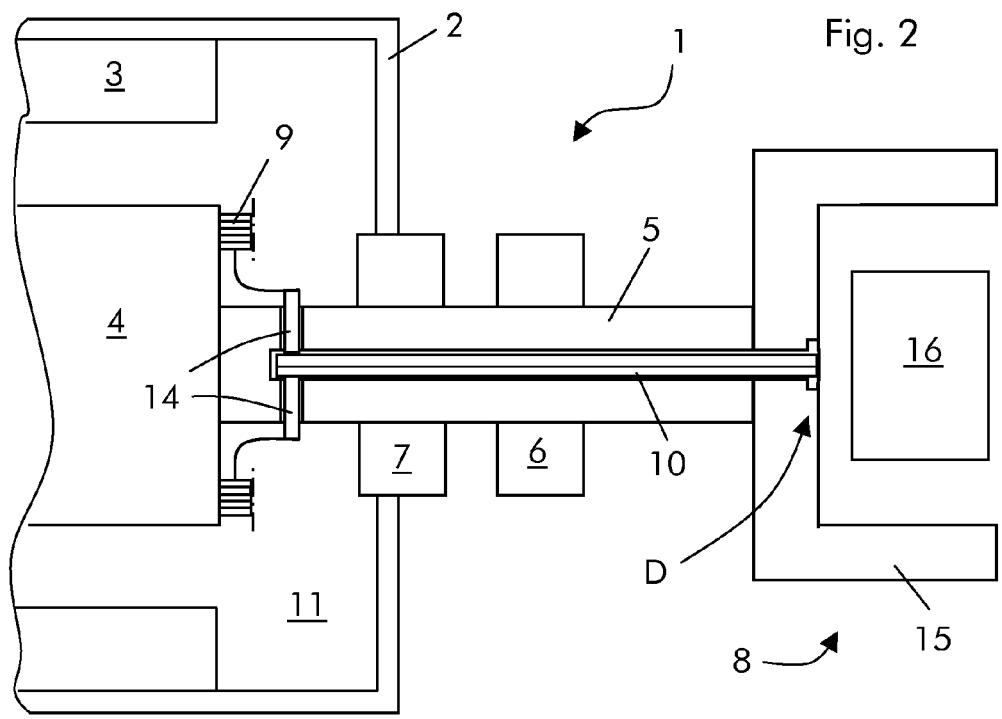

The seals are located in position C (embodiment of FIGS. 1 and 3) or D (embodiment of FIGS. 2 and 4). This lets the lead 10 be hydrogen cooled.

Operation is very secure, because in case a leakage occurs such that $H_2$ passes through the first seal 20, it enters the chamber 22 without reaching the exciter 8 (or its components such as the slip rings 12). In addition, from the chamber 22, $H_2$ passes through the holes 23 to reach the sensor 24.

This lets the $H_2$ leakages be detected in a very early stage, such that security procedures can be implemented avoiding any risks and allowing operating the generator in a safe and reliable way.

In addition, since the $H_2$ passes through the holes 23, it does not accumulate (at a high pressure) in the chamber 22 with the risk of overcoming also the second seal 21.

Moreover, seal quality tests can also be carried out in a very easy way, not only during manufacturing, but also during short outages of the generator. In fact, in order to execute a seal quality test, only the holes 23 must be closed, this being an easy operation because of the small diameter of these holes. Then the chamber 22 must be pressurized (for example via one of the holes 23) and the quality of the seals 20, 21 is then checked in a traditional way.

Carrying out tests this way in addition to the already cited advantages is also very cheap and quick, because of the limited volume to be pressurized.

Naturally the features described may be independently provided from one another.

In practice the materials used and the dimensions can be chosen at will according to requirements and to the state of the art.

REFERENCE NUMBERS 1 generator
2 casing
3 stator
4 rotor
5 shaft
5a slip ring shaft
6 bearing
7 seal ring
8 exciter
9 windings
10 lead
11 inner of 2
12 slip rings
13 rod
14 stank
15 rotor of 8
16 stator of 8
20, 21 seal
22 chamber
23 holes
24 sensor
25 duct wall
26 flexible plates
27, 28 portions of 20, 21
29, 30 O-ring
A, B, C, D positions where traditional seals are located While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. A sealed electric generator comprising:
a rotor with field windings, a stator, a shaft connected to the rotor, the shaft having an axis of rotation, an exciter, and a casing housing the stator and the rotor;
wherein the shaft comprises a duct and a lead arranged in the duct to extend longitudinally along the axis of rotation parallel to the shaft, the lead configured and arranged to carry electric power from the exciter to the rotor field windings, said duct comprising a sealing unit configured and arranged to prevent gas inside the casing from reaching the exciter;
wherein said sealing unit comprises a first seal and a second seal defining a chamber between the first and second seals, such that gas that leaks past either of the first and second seals enters the chamber; and
wherein the first and second seals are annular and arranged in contact with and surrounding the lead that extends longitudinally along the axis of rotation, parallel to the shaft.

2. A generator as claimed in claim 1, wherein said rotor shaft has at least one hole connecting the chamber to outside the rotor.

3. A generator as claimed in claim 2, wherein said at least one hole is at least partially radially oriented.

4. A generator as claimed in claim 3, further comprising:
a sensor adjacent an outlet of the at least one hole, the sensor configured and arranged to detect said gas.

5. A generator as claimed in claim 1, wherein:
the rotor shaft includes an inner wall defining the duct;
the duct includes an enlarged portion; and
said first and second seals are spaced apart in the enlarged duct portion, such that the chamber is defined at least between the seals and the wall.

6. A generator as claimed in claim 5, wherein:
the shaft includes a terminal portion; and
said enlarged duct portion is defined at the shaft terminal portion.

7. A generator as claimed in claim 6, wherein the enlarged duct portion has at least a first diameter and a second diameter, each housing one of the first and second seals, wherein the first diameter is smaller than the second diameter.

8. A generator as claimed in claim 6, further comprising:
a slip ring shaft adjacent to the shaft terminal portion; and
wherein the enlarged duct portion is closed by the slip ring shaft.

9. A generator as claimed in claim 6, further comprising:
flexible plates connected to the lead.

10. A generator as claimed in claim 1, further comprising:
radial stalks connected to the rotor field windings;
wherein said duct includes an axial portion and radial holes, wherein the axial portion houses said lead and the radial holes house the radial stalks.

11. A generator as claimed in claim 10, wherein said duct partly extends in the slip ring shaft, and further comprising additional radial holes and radial rods connected to the slip rings, the radial holes housing the radial rods.

12. A generator as claimed in claim 1, wherein:
the rotor shaft includes an inner wall defining the duct; and
each of the first and second seals has a portion connected to the lead and a portion connected to the wall, and further comprising O-rings between said first and second seal portions.

13. A generator as claimed in claim 12, further comprising:
additional O-rings between the seal portion connected to the wall and the shaft.

14. A generator as claimed in claim 1, wherein each sealing unit comprises at least two seals one adjacent to the other.

* * * * *